United States Patent
Cox et al.

(10) Patent No.: US 8,614,979 B2
(45) Date of Patent: Dec. 24, 2013

(54) TECHNIQUES FOR HIGH MOBILITY COMMUNICATIONS

(75) Inventors: Timothy F. Cox, Palo Alto, CA (US); Norman Lo, Milpita, CA (US)

(73) Assignee: Intel Corporation, Santa Clara ( * ) Notice: Subject to any disclaimer, the term of this patent is extended or adjusted under 35 U.S.C. 154(b) by 594 days.

(21) Appl. No.: 12/241,249

(22) Filed: Sep. 30, 2008

(65) Prior Publication Data
US 2010/0080178 A1 Apr. 1, 2010

(51) Int. Cl.
*H04W 4/00* (2009.01)
(52) U.S. Cl.
USPC .......................................... 370/329; 370/341
(58) Field of Classification Search
USPC ......................................................... 370/329
See application file for complete search history.

(56) References Cited

U.S. PATENT DOCUMENTS

| | | | |
|---|---|---|---|
| 6,339,613 B2 * | 1/2002 | Terry | 375/227 |
| 6,724,815 B1 * | 4/2004 | Jepsen et al. | 375/225 |
| 6,868,276 B2 * | 3/2005 | Nissila | 455/504 |
| 7,120,440 B2 * | 10/2006 | Cho et al. | 455/441 |
| 2006/0025079 A1 * | 2/2006 | Sutskover et al. | 455/67.11 |
| 2008/0212697 A1 * | 9/2008 | Wilhelmsson | 375/260 |
| 2009/0213920 A1 * | 8/2009 | Yip et al. | 375/231 |

OTHER PUBLICATIONS

Novak, R.; Krzymien, W.;, "SS-OFDM-F/TA system packet size and structure for high mobility cellular environments," Vehicular Technology Conference, 2003. VTC 2003-Spring. The 57th IEEE Semiannual, vol. 2, No., pp. 1438-1444 vol. 2, Apr. 22-25, 2003.*

* cited by examiner

*Primary Examiner* — Derrick Ferris
*Assistant Examiner* — Kodzovi Acolatse
(74) *Attorney, Agent, or Firm* — Kacvinsky Daisak PLLC

(57) ABSTRACT

Techniques for high mobility communications are described. An apparatus may comprise a fixed device having a zone management module operative to perform mobility zone classification for multiple mobile devices in a mobile communications system. The zone management module operative assigns the mobile devices to different mobility zones based on a spectral characterization parameter for each mobile device. The spectral characterization parameter represents a type of operating environment for the mobile device. The zone management module may allocate resources to the mobile devices based on the assigned mobility zones. Other embodiments are described and claimed.

21 Claims, 12 Drawing Sheets

600

GENERATE A SPECTRAL CHARACTERIZATION PARAMETER REPRESENTING A TYPE OF OPERATING ENVIRONMENT FOR A MOBILE DEVICE
602

SEND A DOPPLER CODEWORD HAVING THE SPECTRAL CHARACTERIZATION PARAMETER FOR THE MOBILE DEVICE FROM THE MOBILE DEVICE TO A FIXED DEVICE
604

RECEIVE THE DOPPLER CODEWORD HAVING A SPECTRAL CHARACTERIZATION PARAMETER FOR THE MOBILE DEVICE BY THE FIXED DEVICE
606

ASSIGN THE MOBILE DEVICE TO A MOBILITY ZONE BASED ON THE SPECTRAL CHARACTERIZATION PARAMETER
608

ALLOCATE RESOURCES TO THE MOBILE DEVICE BASED ON THE ASSIGNED MOBILITY ZONE
610

TECHNIQUES FOR HIGH MOBILITY COMMUNICATIONS

BACKGROUND

A mobile device such as a cellular telephone typically communicates with a fixed device such as a base station over a portion of radio-frequency (RF) spectrum. For example, the mobile device and fixed device communicate over one or more RF communication channels. In some cases, however, the mobile device may be moving fast enough to cause a frequency shift in the communications frequencies used for the communication channels. Left uncorrected, the frequency shift may degrade communications between the fixed device and mobile device. In an extreme case the frequency shift may cause the communication channel to disconnect or drop entirely. Consequently, there may be a substantial need in compensating for frequency shifts due to mobility issues.

BRIEF DESCRIPTION OF THE DRAWINGS

FIG. 6 illustrates one embodiment of a first logic flow.

DETAILED DESCRIPTION

Figure 1:
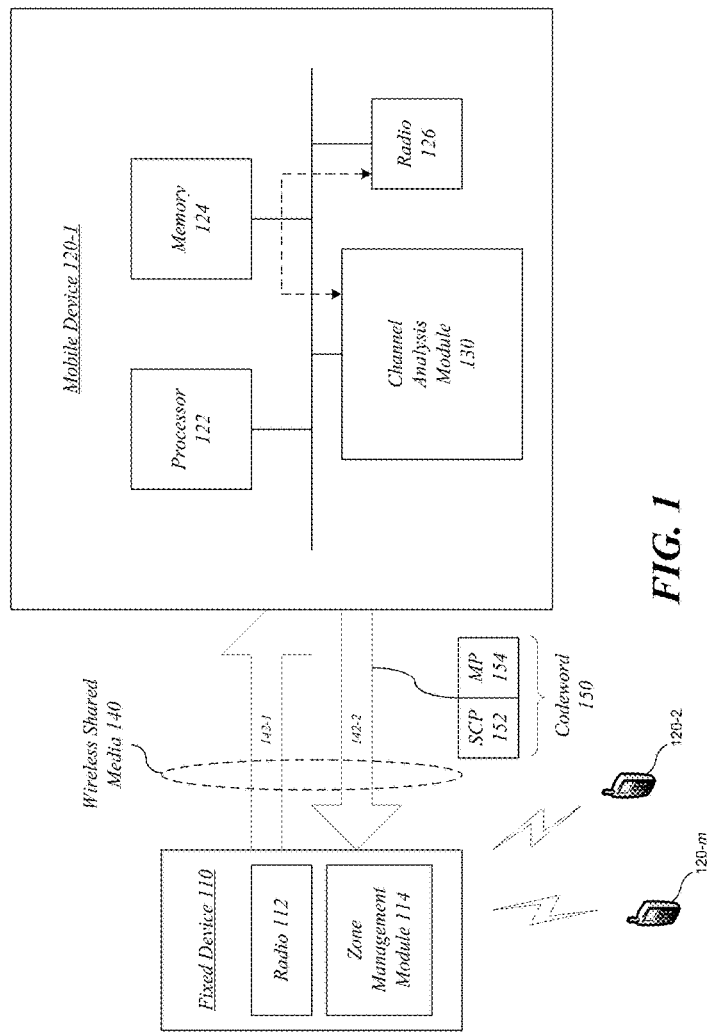
FIG. 1 illustrates one embodiment of a first communications system.

Various embodiments may be generally directed to communication techniques for a wireless communications network, such as a mobile broadband communications system. Some embodiments may be particularly directed to techniques for estimating, characterizing, correcting, compensating or otherwise mitigating mobility induced frequency shifts, such as Doppler effects.

The Internet is leaping towards mobile applications. This evolution is demanding ubiquitous communications at high data rates. Mobile broadband communications systems utilizing orthogonal frequency-division multiplexing (OFDM) and orthogonal frequency-division multiple access (OFDMA) techniques are emerging as one of the dominant technologies to fulfill high data rate demands. OFDM is sensitive to interference, however, and ubiquity requirements imply the need to handle various mobility scenarios. Doppler estimation and characterization become an important component for high data rate modulation in high mobility environments. Doppler parameters can be used with various mobile operations, such as assisting with channel estimation and tracking, intercarrier interference (ICI) mitigation, hand off and channel allocation schemes, adaptive encoding and interleaving schemes, and other mobile operations.

Mobile devices in a fading environment encounter varying degrees of degradation in the form of Doppler frequency shift and/or spectral broadening. The latter produces ICI in systems with densely populated orthogonal subcarriers, such as OFDM systems. The degree of degradation depends on the vehicular speed and the channel scattering characteristics. In OFDMA systems, where different users are interleaved across the spectrum, degradation from mobility impacts not only the performance of the user undergoing fading, but also impacts users in neighboring subcarriers, who may be in a completely different scattering environment.

To solve these and other problems, various embodiments utilize a closed loop mobile communications system to classify and group users undergoing different fading environments into different mobility zones. The closed loop mobile communications system provides innovations in frame structure, resource allocation, channel estimation routine, negotiation protocol and Doppler codebook design.

Some embodiments implement an enhanced spectral characterization technique to characterize a Doppler channel for a wireless OFDM system. The enhanced spectral characterization technique may be used to estimate Doppler frequencies in uniform scattering scenarios as well as fading environments. In addition to determining channel fading variation, the enhanced spectral characterization technique can also be used to estimate a receiver carrier frequency offset (CFO). In those communications environments where scattering elements are present in and against the direction of travel, the enhanced spectral characterization technique can be used to separate the transmitter and receiver frequencies.

Various embodiments may comprise a mobile broadband communications system having various types of wireless devices, such as a fixed device and one or more mobile devices. An example of a mobile communications system may comprise a cellular radiotelephone system utilizing OFDM and/or OFDMA techniques. An example of a fixed device may comprise fixed equipment for a cellular radiotelephone system, such as a base station or node B. An example of a mobile device may comprise a mobile subscriber station (MSS) for a cellular radiotelephone system. The fixed device and the mobile device may exchange channel information to improve system performance (e.g., link performance). The exchanged information may include, among other information, a spectral characterization parameter derived using an enhanced spectral characterization technique. The spectral characterization parameter may represent a type of operating environment (e.g., fading or scattering environment) for the mobile device. The exchanged information may further include, among other information, a mobility parameter representing a degree of mobility for the mobile device. The fixed device may use the spectral characterization parameter and/or the mobility parameter to implement and manage mobility zones for the mobile devices. The mobile devices may use the spectral characterization parameter for Doppler frequency estimation and correction. In this manner, the spectral characterization parameter may reduce or eliminate the effects of Doppler frequency shifts and ensures good signal quality, enabling high mobile velocity and supporting higher data rates for a mobile broadband communications system. The embodiments are not limited in this context.

Additionally or alternatively, various embodiments may allocate communications resources based on the assigned mobility zones for the mobile devices. To improve link performance, highly mobile users assigned to a special mobility zone may be allocated special communications resources. In a high mobility zone, for example, the fixed device may use special pilots called midambles to assist in performing channel estimation at the receiver side of the mobile devices. The fixed device may also allocate other special communications resources to the high mobility devices, such as using smaller packet sizes and additional control signaling to help performance. Examples of additional control signaling may include without limitation feedback CFO, position information, global positioning satellite (GPS)-assisted speed vectors, and other control signals. The embodiments are not limited in this context.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

FIG. 1 illustrates a block diagram of one embodiment of a communications system 100. In various embodiments, the communications system 100 may comprise multiple nodes. A node generally may comprise any physical or logical entity for communicating information in the communications system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation.

In various embodiments, the communications system 100 may comprise, or form part of a wired communications system, a wireless communications system, or a combination of both. For example, the communications system 100 may include one or more nodes arranged to communicate information over one or more types of wired communication links. Examples of a wired communication link, may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The communications system 100 also may include one or more nodes arranged to communicate information over one or more types of wireless communication links, such as wireless shared media 140. Examples of a wireless communication link may include, without limitation, a radio channel, infrared channel, radio-frequency (RF) channel, Wireless Fidelity (WiFi) channel, a portion of the RF spectrum, and/or one or more licensed or license-free frequency bands. In the latter case, the wireless nodes may include one more wireless interfaces and/or components for wireless communication, such as one or more radios, transmitters, receivers, transceivers, chipsets, amplifiers, filters, control logic, network interface cards (NICs), antennas, antenna arrays, and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth. In one embodiment, certain devices may include antenna arrays of multiple antennas to implement various adaptive antenna techniques and spatial diversity techniques.

As shown in the illustrated embodiment of FIG. 1, the communications system 100 comprises multiple elements, such as a fixed device 110 and a set of mobile devices 120-1-$m$, all of which communicate via wireless shared media 140. The fixed device may further include a radio 112 and a zone management module 114. As shown by the mobile device 120-1, the mobile devices 120-1-$m$ may further include a processor 122, a memory unit 124, a channel analysis module 130, and a radio 126. The embodiments, however, are not limited to the elements shown in FIG. 1

In various embodiments, the communications system 100 may comprise or be implemented as a mobile broadband communications system. Examples of mobile broadband communications systems include without limitation systems compliant with various Institute of Electrical and Electronics Engineers (IEEE) standards, such as the IEEE 802.11 standards for Wireless Local Area Networks (WLANs) and variants, the IEEE 802.16 standards for Wireless Metropolitan Area Networks (WMANs) and variants, and the IEEE 802.20 or Mobile Broadband Wireless Access (MBWA) standards and variants, among others. In one embodiment, for example, the communications system 100 may be implemented in accordance with the Worldwide Interoperability for Microwave Access (WiMAX) or WiMAX II standard. WiMAX is a wireless broadband technology based on the IEEE 802.16 standard of which IEEE 802.16-2004 and the 802.16e amendment (802.16e-2005) are Physical (PHY) layer specifications. WiMAX II is an advanced Fourth Generation (4G) system based on the IEEE 802.16j and IEEE 802.16m proposed standards for International Mobile Telecommunications (IMT) Advanced 4G series of standards. Although some embodiments may describe the communications system 100 as a WiMAX or WiMAX II system or standards by way of example and not limitation, it may be appreciated that the communications system 100 may be implemented as various other types of mobile broadband communications systems and standards, such as a Universal Mobile Telecommunications System (UMTS) system series of standards and variants, a Code Division Multiple Access (CDMA) 2000 system series of standards and variants (e.g., CDMA2000 1xRTT, CDMA2000 EV-DO, CDMA EV-DV, and so forth), a High Performance Radio Metropolitan Area Network (HIPERMAN) system series of standards as created by the European Telecommunications Standards Institute (ETSI) Broadband Radio Access Networks (BRAN) and variants, a Wireless Broadband (WiBro) system series of standards and variants, a Global System for Mobile communications (GSM) with General Packet Radio Service (GPRS) system (GSM/GPRS) series of standards and variants, an Enhanced Data Rates for Global Evolution (EDGE) system series of standards and variants, a High Speed Downlink Packet Access (HSDPA) system series of standards and variants, a High Speed Orthogonal Frequency-Division Multiplexing (OFDM) Packet Access (HSOPA) system series of standards and variants, a High-Speed Uplink Packet Access (HSUPA) system series of standards and variants, and so forth. The embodiments are not limited in this context.

In various embodiments, the communications system 100 may comprise a fixed device 110 having wireless capabilities. A fixed device may comprise a generalized equipment set providing connectivity, management, or control of another wireless device, such as one or more mobile devices. Examples for the fixed device 110 may include a wireless access point (AP), base station or node B, router, switch, hub, gateway, and so forth. In one embodiment, for example, the fixed device may comprise a base station or node B for a cellular radiotelephone system or mobile broadband communications system. The fixed device 110 may also provide access to a network (not shown). The network may comprise, for example, a packet network such as the Internet, a corporate or enterprise network, a voice network such as the Public Switched Telephone Network (PSTN), and so forth. Although some embodiments may be described with the fixed device 110 implemented as a base station or node B by way of example, it may be appreciated that other embodiments may be implemented using other wireless devices as well. The embodiments are not limited in this context.

In various embodiments, the communications system 100 may comprise a set of mobile devices 120-1-*m* having wireless capabilities. The mobile devices 120-1-*m* may comprise a generalized equipment set providing connectivity to other wireless devices, such as other mobile devices or fixed devices (e.g., fixed device 110). Examples for the mobile devices 120-1-*m* may include without limitation a computer, server, workstation, notebook computer, handheld computer, telephone, cellular telephone, personal digital assistant (PDA), combination cellular telephone and PDA, and so forth. In one embodiment, for example, the mobile devices 120-1-*m* may be implemented as mobile subscriber stations (MSS) for a WMAN. Although some embodiments may be described with the mobile devices 120-1-*m* implemented as a MSS by way of example, it may be appreciated that other embodiments may be implemented using other wireless devices as well. The embodiments are not limited in this context.

As shown by the mobile device 120-1, the mobile devices 120-1-*m* may comprise a processor 122. The processor 122 may be implemented as any processor, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processor 122 may be implemented as a general purpose processor, such as a processor made by Intel® Corporation, Santa Clara, Calif. The processor 122 may also be implemented as a dedicated processor, such as a controller, microcontroller, embedded processor, a digital signal processor (DSP), a network processor, a media processor, an input/output (I/O) processor, and so forth. The embodiments are not limited in this context.

As further shown by the mobile device 120-1, the mobile devices 120-1-*m* may comprise a memory unit 124. The memory 124 may comprise any machine-readable or computer-readable media capable of storing data, including both volatile and non-volatile memory. For example, the memory 124 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of the memory 124 may be included on the same integrated circuit as the processor 122, or alternatively some portion or all of the memory 124 may be disposed on an integrated circuit or other medium, for example a hard disk drive, that is external to the integrated circuit of the processor 122. The embodiments are not limited in this context.

In various embodiments, the devices 110, 120 may communicate information over wireless shared media 140 via respective radios 112, 126. The wireless shared media 140 may comprise one or more allocations of RF spectrum. The allocations of RF spectrum may be contiguous or non-contiguous. In some embodiments, the radios 112, 126 may communicate information over the wireless shared media 140 using various multicarrier techniques utilized by, for example, WiMAX or WiMAX II systems. For example, the radios 112, 126 may utilize various Multiple-Input Multiple-Output (MIMO) techniques to perform beam forming, spatial diversity or frequency diversity.

In general operation, the radios 112, 126 may communicate information using one or more communications channels, such as communications channels 142-1-*p*. A communication channel may be a defined set of frequencies, time slots, codes, or combinations thereof. In one embodiment, for example, the transmitting portion of the radio 112 of the fixed device 110 may communicate media and control information to the receiving portion of the radio 126 of the mobile devices 120-1-*m* using the communications channel 142-1, sometimes referred to as a "downlink channel." In one embodiment, for example, the transmitting portion of the radio 126 of the mobile device 110 may communicate media and control information to the receiving portion of the radio 112 of the fixed device 110 using the communications channel 142-2, sometimes referred to as an "uplink channel." In some cases, the communications channels 142-1, 142-2 may use the same or different set of transmit and/or receive frequencies, depending upon a given implementation.

Since the communications system 100 is a mobile broadband communications system, it is designed to maintain communications operations even when a mobile device 120-1-*m* is moving. Slower movement of the mobile devices 120-1-*m*, such as when an operator is walking, causes relatively minor degradation of communications signals due to the actual movement and is easily corrected. Faster movement of the mobile devices 120-1-*m*, such as when an operator is in a moving vehicle, however, may cause major degradation of communications signals due to frequency shifts. An example of such frequency shifts may be Doppler frequency shifts caused by the Doppler effect.

The Doppler effect, named after Christian Doppler, is the change in frequency and wavelength of a wave as perceived by an observer moving relative to the source of the waves. For waves that propagate in a wave medium, such as sound waves, the velocity of the observer and of the source are reckoned relative to the medium in which the waves are transmitted. The total Doppler effect may therefore result from either motion of the source or motion of the observer, which in this case would be movement by the mobile devices 120-1-*m*. As the mobile devices 120-1-*m* move their velocity relative to the fixed device 110 induces a Doppler shift of the transmit RF signal used by the fixed device 110 as received by the mobile devices 120-1-*m*. The received signal is used by the mobile devices 120-1-*m* to derive their own transmit RF signal. If uncorrected for the Doppler shift, the transmit RF signal used by the mobile devices 120-1-*m* would arrive at the fixed device 110 with twice the Doppler error, with the first from the downlink channel 142-1 and the second from the uplink channel 142-2. This is the reason why cellular telephone users sometimes experience dropped calls while in moving vehicles. Right before the call drops, the user typically can hear the other speaker on the downlink channel, but the other speaker cannot hear the user on the uplink channel.

Doppler estimation and characterization becomes an important component for high data rate modulation in high mobility environments. Doppler parameters can be used with various mobile operations, such as assisting with channel estimation and tracking, ICI mitigation, hand off and channel allocation schemes, adaptive encoding and interleaving schemes, and other mobile operations.

To solve these and other problems, the devices 110, 120 may implement and use an enhanced spectral characterization technique to characterize a Doppler channel for a wireless OFDM system, such as a WiMAX or WiMAX II system. The enhanced spectral characterization technique may be used to estimate Doppler frequencies in the uniform scattering scenarios as well as fading environments. The devices 110, 120 may exchange channel information, including a Doppler codeword 150. The Doppler codeword 150 may include a spectral characterization parameter 152 derived using the enhanced spectral characterization technique. The spectral characterization parameter may represent a type of operating environment for the mobile devices 120-1-$m$. The Doppler codeword 150 may optionally include a mobility parameter 154. The mobility parameter may represent a degree of mobility for the mobile devices 120-1-$m$.

The information derived from the enhanced spectral characterization technique and as provided by the Doppler codeword 150 may be used for different operations. For example, the fixed device 110 may use the spectral characterization parameter 152 and/or the mobility parameter 154 to implement and manage mobility zones for mobile devices, such as the mobile devices 120-1-$m$. The mobile devices 120-1-$m$ may use the spectral characterization parameter for Doppler frequency estimation and correction. In this manner, the enhanced spectral characterization technique may reduce or eliminate the effects of Doppler frequency shifts and ensures good signal quality, enabling high mobile velocity and supporting higher data rates for a mobile broadband communications system.

Zone Management

The mobile devices 120-1-$m$ in a fading environment encounter varying degrees of degradation in the form of Doppler frequency shift and/or spectral broadening. The latter produces ICI in systems with densely populated orthogonal subcarriers, such as OFDM systems. The degree of degradation depends on the vehicular speed and the channel scattering characteristics. In OFDMA systems, where different users are interleaved across the spectrum, degradation from mobility impacts not only the performance of the user undergoing fading, but also impacts users in neighboring subcarriers, who may be in a completely different scattering environment. Therefore, the zone management module 114 implements a closed loop system to classify and group users undergoing different fading environments into different mobility zones. This closed loop mobile communication system consist of innovation in the frame structure and resource allocation, the channel estimation routine, the negotiation protocol and Doppler codebook design.

In one embodiment, for example, the fixed device 110 may include a zone management module 114. The zone management module may be operative to perform mobility zone classification for multiple mobile devices in a mobile communications system, the zone management module operative to assign the mobile devices 120-1-$m$ to different mobility zones based on the spectral characterization parameter 152 for each mobile device 120-1-$m$. The spectral characterization parameter 152 may represent a type of operating environment for each mobile device 120-1-$m$. The operations of the fixed device 110 in general, and the zone management module 114 in particular, may be described in more detail with reference to FIG. 2.

Figure 2:
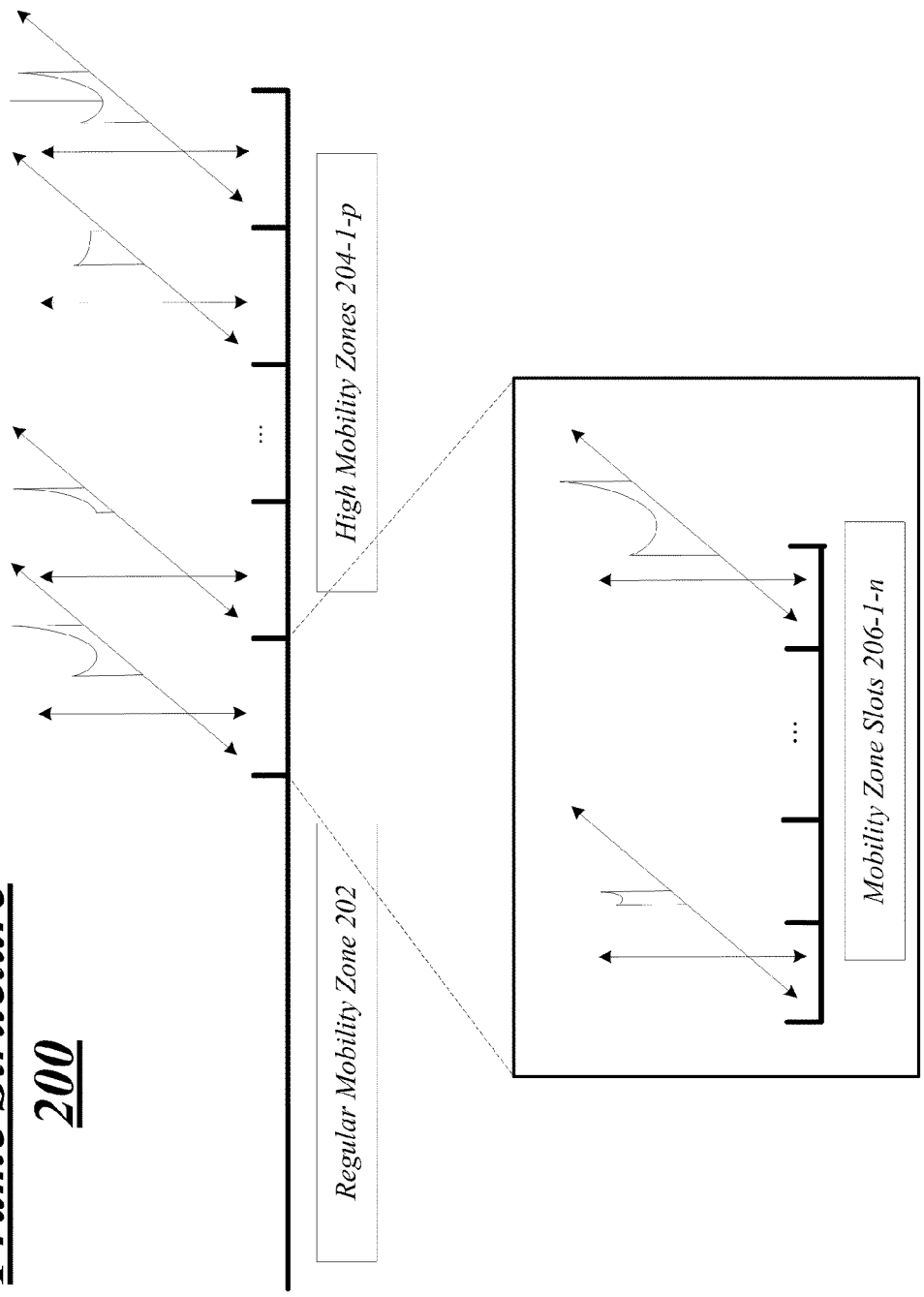
FIG. 2 illustrates one embodiment of a frame structure.

FIG. 2 illustrates one embodiment of a frame structure 200. The frame structure 200 may comprise various mobility zones. The mobility zones may represent different types of operating environments within which the mobile devices 120-1-$m$ are traveling, as well as the levels of mobility (e.g., speed) for the mobile devices 120-1-$m$. In the illustrated embodiment shown in FIG. 2, the frame structure 200 may include two mobility zones, including a regular mobility zone 202 and one or more high mobility zones 204-1-$p$. It may be appreciated, however, that any number of different mobility zones may be used.

The regular mobility zone 202 may be used for the mobile devices 120-1-$m$ having a lower degree of mobility and a higher modulation order relative to those mobile devices 120-1-$m$ suitable for the high mobility zone 204. The mobile devices 120-1-$m$ with a lower degree of mobility can be grouped together into a common zone since they produce lower ICI to neighboring mobile devices.

The high mobility zones 204-1-$p$ may be used for the mobile devices 120-1-$m$ having different operating environments and/or a higher degree of mobility relative to those mobile devices 120-1-$m$ suitable for the regular mobility zone 202. The mobile devices 120-1-$m$ with different operating environments and/or a higher degree of mobility are separated from those mobile devices in the regular mobility zone 202 since they produce a relatively higher ICI to neighboring mobile devices.

The mobility zones 202, 204-1-$p$ may be used to isolate interfering mobile users to special mobility zones. The fixed device 110 may assign mobile devices 120-1-$m$ to different mobility zones based on the spectral characterization parameter 152 for each mobile device 120-1-$m$. The fixed device 110 may use the assigned mobility zone as a basis for allocating resources by the fixed device 110 among the multiple mobile devices 120-1-$m$. For example, those mobile devices 120-1-$m$ operating at lower speed thereby creating lower ICI for neighboring mobile devices may be assigned to lower mobility zone and allocated less communications resources, while those mobile devices 120-1-$m$ operating in different operating environments and/or at higher speeds thereby creating higher ICI for neighboring mobile devices may be assigned a higher mobility zone and allocated more communications resources, with varying levels of granularity there between. In this manner, channel performance may be improved for individual mobile devices 120-1-$m$ and across the entire communications system 100.

In various embodiments, the high mobility zones 204-1-$p$ may be allocated according to an operating environment, such as a given type of scattering environment or fading environment, as determined from the spectral characterization parameter 152. Examples of different operating environments may include without limitation isotropic scattering environment (e.g., Jake's Doppler spectrum), Rician fading environment, symmetric environment, asymmetric environment, and other irregular Doppler spectrums that may characterize the operating environment. Consequently, users with common operating environments may be allocated to a common high mobility zone 204-1-$p$. Accordingly, the high mobility zones 204-1-$p$ allow mobile devices experiencing the same type of channel based on the spectral shape to be grouped together for an efficient allocation of resources suitable for the channel.

In various embodiments, the high mobility zones 204-1-$p$ may be further divided into various mobility zone slots 206-1-$n$. The mobility zone slots 206-1-$n$ provide a higher level of granularity for mobile devices 120-1-$m$ operating at higher speeds, at higher data rates, and other desired operating parameters. In one embodiment, for example, the mobility zone slots 206-1-$n$ may be allocated based on a degree of mobility as determined from the mobility parameter 154. Consequently, users with extremely high mobility and/or high data rate usage may be allocated a single mobility zone slot 206-1-n. Accordingly, the mobility zone slots 206-1-n allow those mobile devices with the same fading to be further allocated based on mobility, thereby providing a higher level of isolation and treatment for higher speed users.

Referring again to FIG. 1, the fixed device 110 includes the radio 112 communicatively coupled to the zone management module 114. The radio 112 may receive the Doppler codeword 150 over the uplink channel 142-2 of the wireless shared media 140 from one of the mobile devices 120-1-m, such as the mobile device 120-1. The Doppler codeword 150 includes a spectral characterization parameter 152 and/or a mobility parameter 154 for the mobile device 120-1.

The zone management module 114 receives the Doppler codeword 150 and decodes the parameters 152, 154 from the Doppler codeword 150. The zone management module 114 assigns the mobile device 120-1 to one of the mobility zones 202, 204-1-p based on the decoded parameters 152, 154. The zone management module 114 may have one or more defined threshold parameters that may be used to assign the mobile device 120-1 to the appropriate mobility zone 202, 204-1-p. For example, the zone management module 114 may (optionally) compare the mobility parameter 154 to the defined threshold parameter, to determine whether the mobile device 120-1 should be initially assigned to the regular mobility zone 202 or a high mobility zone 204-1-p based on the results of the comparison. The zone management module 114 may then use the spectral characterization parameter 152 to specifically assign the mobile device 120-1 to a particular one of the high mobility zones 204-1-p based on the operating environment (spectral shape) for the mobile device 120-1. For example, each of the high mobility zones 204-1-p may be arranged for certain spectral characterizations, and the mobile device 120-1 may be assigned to a high mobility zone 204-1-p with the spectral characterizations that substantially matches with spectral characterization parameter 152 for the mobile device 120-1.

In one embodiment, the zone management module 114 is arranged to assign mobile devices 120-1-m to high mobility subzones 206-1-n of a given high mobility zone 204-1-p based on the mobility parameter 154. The mobility parameter 154 may represent various degrees of mobility for the mobile devices 120-1-m. For example, the zone management module 114 may interpret the mobility parameter 154 for the mobile device 120-1, and assign the mobile device 120-1 to a mobility zone slot 206-1 for mobile devices moving at 100-120 kilometers per hour. This same assignment operation may be performed for each of the active mobile devices 120-1-m operating within the cell serviced by the fixed device 110.

Once the mobile devices 120-1-m have been assigned to an appropriate mobility zone, the zone management module 114 is arranged to allocate resources to the mobile devices 120-1-m based on the assigned mobility zones. For example, those mobile devices 120-1-m operating at lower speed thereby creating lower ICI for neighboring mobile devices may be assigned to the regular mobility zone 202 and allocated less communications resources, while those mobile devices 120-1-m operating at higher speeds thereby creating higher ICI for neighboring mobile devices may be assigned to a high mobility zone 204-1-p and allocated more or special communications resources. Extremely high mobility users can be further assigned to a separate mobility zone slot 206-1-n and allocated even further special communications resources. In this manner, channel performance may be improved for individual mobile devices 120-1-m and across the entire communications system 100.

To improve link performance, highly mobile users assigned to a high mobility zone 204-1-p may be allocated special communications resources. In the high mobility zone 204-1-p, for example, the fixed device 110 may use special pilots called midambles to assist in performing channel estimation at the receiver side of the mobile devices 120-1-m. In one embodiment, for example, the midambles are implemented for only those mobile devices 120-1-m operating in a high mobility zone 204-1-p to reduce receiver complexity and throughput loss due to the overhead generated by the midambles, although the embodiments are not limited in this context. The fixed device 110 may allocate other special communications resources to the high mobility devices, such as using smaller packet sizes and additional control signaling to help performance. Examples of additional control signaling may include without limitation feedback CFO, position information, GPS-assisted speed vectors, and other control signals. The embodiments are not limited in this context.

In various embodiments, the fixed device 110 may use special pilots called midambles to assist in performing channel estimation at the receiver side of the mobile devices 120-1-m. The fixed device 110 may generate and insert a midamble sequence in an OFDM signal communicated from the fixed device 110 to the mobile devices 120-1-m over the downlink channel 142-1. The generation, communication and processing of the midamble sequences may be described in more detail with reference to FIGS. 8-12.

Spectral Characterization

In various embodiments, the spectral characterization parameter 152 may be derived using an enhanced spectral characterization technique implemented by one or more of the mobile devices 120-1-m. For example, representative mobile device 120-1 includes the channel analysis module 130. The channel analysis module 130 is generally arranged to generate a spectral characterization parameter representing a type of operating environment for the mobile device 120-1. The channel analysis module 130 may pass the spectral characterization parameter as part of a Doppler codeword to the radio 126. The radio 126 transmits the Doppler codeword to the fixed device 110, which is received via the radio 112 of the fixed device 110. The channel analysis module 130 may be described in more detail with reference to FIG. 3.

Figure 3:
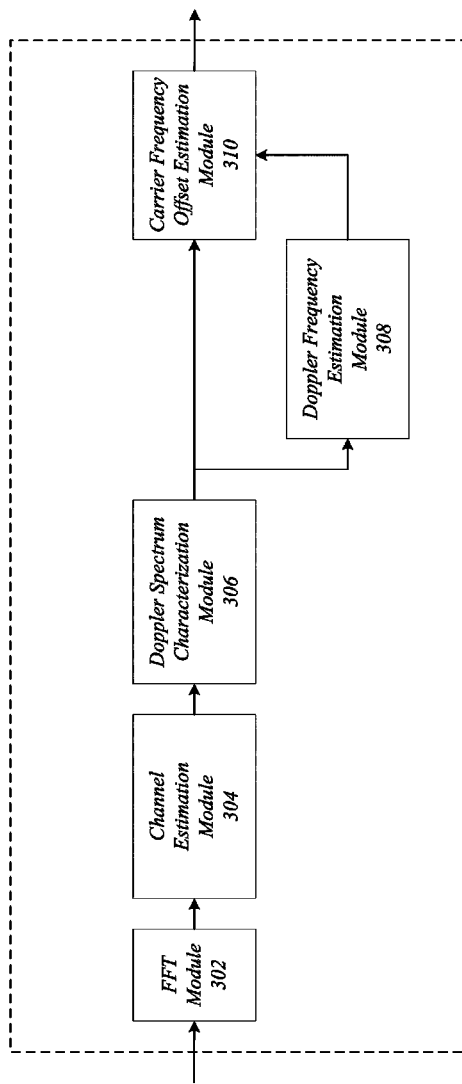
FIG. 3 illustrates one embodiment of a first channel analysis module.

FIG. 3 illustrates a block diagram for the channel analysis module 130. In the illustrated embodiment shown in FIG. 3, the channel analysis module 130 may include, among other elements, a fast Fourier transfer (FFT) module 302, a channel estimation module 304, a Doppler spectrum characterization module 306, a Doppler frequency estimation module 308, and a carrier frequency offset estimation module 310. Although FIG. 3 may show a limited number of elements by way of example, it can be appreciated that more or less elements may be employed for a given implementation.

The channel analysis module 130 may include the FFT module 302 communicatively coupled to the channel estimation module 304. The modules 302, 304 calculate various channel estimate parameters, including channel coefficients during channel acquisition and tracked through the pilot signals for the OFDM waveform. The channel estimation module 304 outputs the channel estimate parameters.

The channel analysis module 130 may include the Doppler spectrum characterization module 306 communicatively coupled to the channel estimation module 304. The Doppler spectrum characterization module 306 receives the channel estimate parameter from the channel estimation module 304, and generates a power spectral density parameter based on the channel estimate parameter. The power spectral density parameter comprises a spectral domain representation of a channel autocorrelation in an ergodic or approximately ergodic system.

Level crossing rate (LCR) is used as the benchmark for the enhanced spectral characterization algorithm used by the Doppler spectrum characterization module 306. In a fading environment where a mobile user moves through a time varying channel, the rate of envelope fluctuation and average fade duration can be used to determine the channel variations. A derivation of the Doppler frequency from the LCR in a Rayleigh fading environment is shown in Equation (1) as follows:

$$f_D = \frac{L(\rho) \cdot e^{\rho^2}}{\sqrt{2\pi}\,\rho} \quad (1)$$

where $f_D$ is the Doppler frequency and $L(\rho)$ is the level crossing rate at threshold $\rho$. For Rician fading channels, this then becomes Equation (2) as follows:

$$f_D = \frac{L(\rho) \cdot e^{K+(K+1)\rho^2}}{\sqrt{2\pi(K+1)}\,\rho \cdot I_o(2\sqrt{K(K+1)}\rho)} \quad (2)$$

where K refers to the ratio of power in the LOS component to the power of the non-LOS component, $I_o$ is the zeroth order modified Bessel function. The LCR results were extended for the general Nakagami distribution as shown in Equation (3) as follows:

$$f_D = \frac{L(\rho) \cdot \Gamma(m) \cdot e^{m\rho^2}}{\sqrt{2\pi(K+1)}\,\rho^{2m-1}} \quad (3)$$

where m refers to the fading parameter, and $\Gamma(m)$ is the gamma function.

In embodiments, a technique based on channel power spectral density estimation is implemented. In OFDM systems, channel coefficients are calculated during channel acquisition and tracked through the pilots. This operation is performed after the FFT demodulator on the receiver side. Neglecting the ICI terms, this generally reduces to a single tap coefficient. Assuming ergodicity, the autocorrelation function in the time domain can be represented by the magnitude square of the channel coefficient in the frequency domain as shown in Equation (4) as follows:

$$\Re(c(t) \cdot c^*(t+\tau)) \overset{\Im}{\longleftrightarrow} |C(f)|^2 \quad (4)$$

The power spectral density of the channel variation can be calculated by tracking a single pilot over multiple OFDM symbols. Consider the example where the channel power spectral density is calculated by computing the FFT on the channel coefficient for a single pilot tone $f_o$ over successive OFDM symbols, the expression is given as shown in Equation (5) as follows:

$$C(f_o, k) \leftrightarrow \Im\{C(f_o, M \cdot n)\} = \sum_{n=0}^{N-1} C(f_o, M \cdot n) \cdot e^{-j2\pi kMn} \quad (5)$$

Here M refers to the decimation factor. To reuse existing hardware blocks such as the FFT while maintaining the same frequency resolution for the power spectral density, the successive OFDM symbols can be filtered and downsampled. The decimation process reduces the overall bandwidth which reduces the noise proportionately. Since the Doppler modulated spectrum is narrow relative to the signal bandwidth, the full Doppler modulated bandwidth is maintained and the resulting signal-to-noise ratio (SNR) of the estimator is much greater than the corresponding $E_S/N_0$.

The decimation of M successive OFDM symbols can be used as a parameter to trade off between frequency resolution by increasing the observation interval and keeping the same FFT size, or reduce FFT computation by keeping a fixed observation interval. The channel power spectral density can then be calculated as shown in Equation (6) as follows:

$$|C(f_o,k)|^2 \quad (6)$$

Further smoothing among successive estimation blocks can be used to refine the estimated Doppler spectrum.

The Doppler spectrum characterization module 306 is arranged to compare a power spectral density parameter with a Doppler codebook. The Doppler spectrum characterization module 306 matches the channel power spectral density against a set of spectrum that is in the Doppler codebook dictionary. The Doppler spectrum characterization module 306 generates the spectral characterization parameter 152 by comparing a power spectral density parameter with spectrum parameters in a Doppler codebook, and selecting a Doppler codeword having the appropriate spectral characterization parameter 152.

The channel analysis module 130 may include the Doppler frequency estimation module 308 communicatively coupled to the Doppler spectrum characterization module 306. The Doppler frequency estimation module 308 is arranged to estimate a level of spectral broadening for the operating environment using the power spectral density parameter.

The channel analysis module 130 may include the carrier frequency offset estimation module 310 communicatively coupled to the Doppler spectrum characterization module 306 and the Doppler frequency estimation module 308. The carrier frequency offset estimation module 310 may receive the estimated Doppler frequencies from the Doppler frequency estimation module 308, and generate a Doppler CFO that is used to mitigate Doppler effects when transmitting from the mobile device 120 to the fixed device 110 using the uplink channel 142-2.

Figure 4:
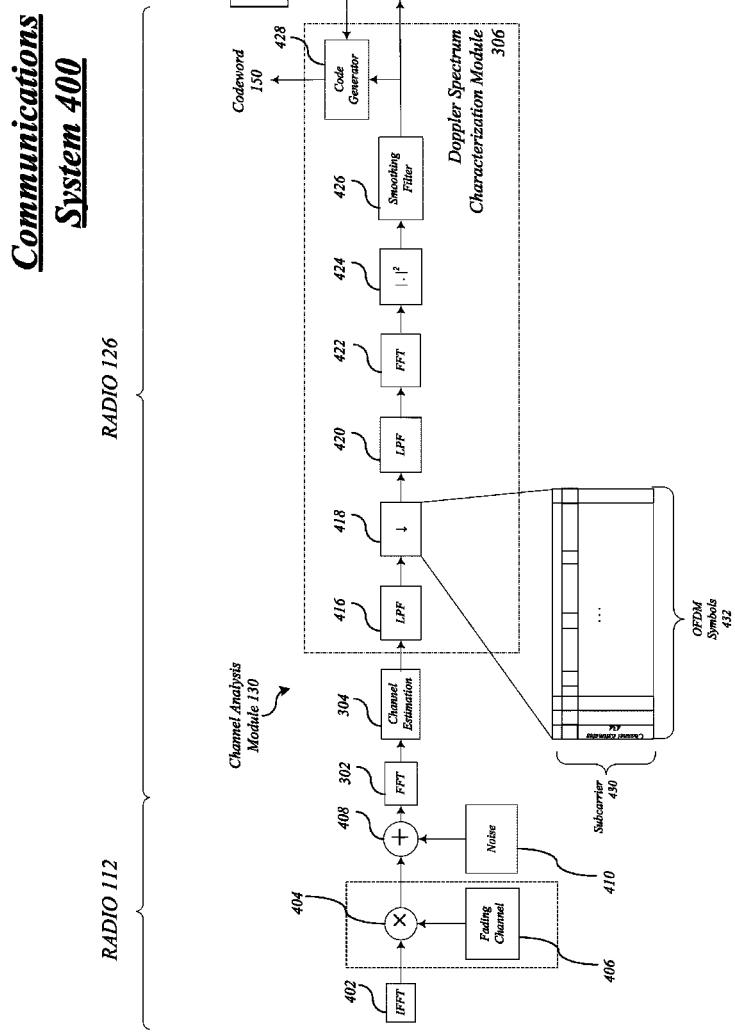
FIG. 4 illustrates one embodiment of a second communications system.

FIG. 4 illustrates a communications system 400. The communications system 400 may be similar to the communications system 100 as described with reference to FIG. 1. In the illustrated embodiment shown in FIG. 4, a transmitter may include an IFFT 402 for the radio 112 of the fixed device 110 arranged to transmit information over wireless shared media 140 via downlink channel 142-1. The downlink channel 142-1 is a fading channel 406, and therefore adds a certain level of fading 404 to the transmitted information. Further, the downlink channel 142-1 may also add 408 some level of noise 410 to the transmitted information. The channel analysis module 130 of the radio 126 of the mobile device 120-1 receives the transmitted information, and the FFT module 302 initiates demodulation operations, which in turn provides output to a channel estimation module 304. The channel estimation module 304 generates channel coefficients that are provided to the Doppler spectrum characterization module 306.

The Doppler spectrum characterization module 306 receives the channel coefficients, and filters the channel coefficients using the low pass filter 416. A decimator 418 decimates M successive OFDM symbols 432 from an OFDM subcarrier 430, which are then filtered using a low pass filter 420. The result is passed through a FFT module 422, and the power module 424 calculates a power spectral density parameter 450. The power spectral density parameter 450 is smoothed using a smoothing filter 426, and output from the Doppler spectrum characterization module 306 for use by the Doppler frequency estimation module 308.

The output of the smoothing filter 426 is also received by the code generator 428. The code generator 428 compares the power spectral density parameter with 450 with a Doppler codebook. The code generator 428 matches the power spectral density parameter 450 against a set of spectrum that is in the Doppler codebook dictionary. The code generator 428 selects a Doppler codeword 150 having the appropriate spectral characterization parameter 152.

The code generator 428 may also receive a mobility parameter 154 from a mobility module 460. The mobility module 460 may generate the mobility parameter 154 using any number of mobility determination techniques for estimating speed for a moving object, such as a vehicle containing the mobile device 120-1. Examples of suitable mobility determination techniques may include without limitation level crossing rate techniques, channel autocorrelation techniques, location based techniques (e.g., using global positioning systems), and so forth. The code generator 428 may receive the mobility parameter 154 from the mobility module 460 (or some other element of the mobile device 120-1), and use the power spectral density parameter 450 and the mobility parameter 154 to select the appropriate Doppler codeword 150 having the appropriate spectral characterization parameter 152 and mobility parameter 154. The radio 126 of the mobile device 120-1 may transmit the Doppler codeword 150 over the wireless shared media 140 via the uplink channel 142-2 to the radio 112 of the fixed device 110. The fixed device 110 may use the Doppler codeword 150 for zone management operations.

Figure 5:
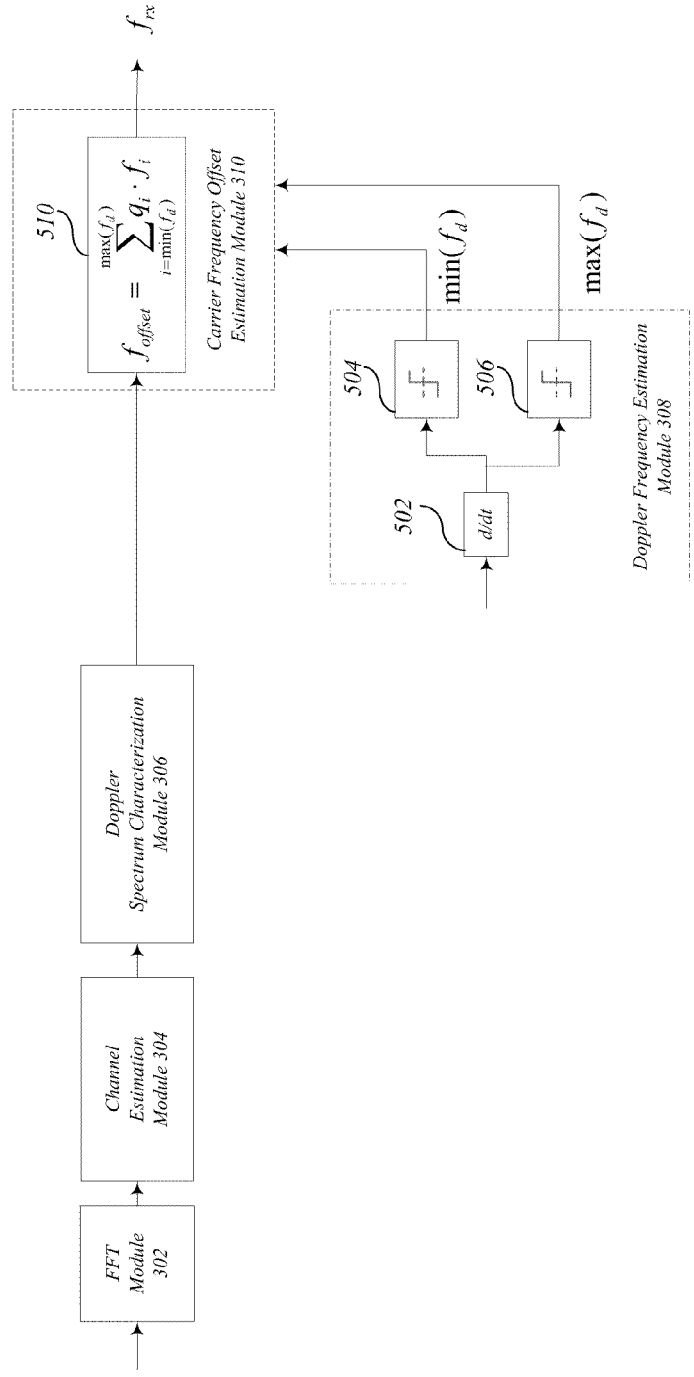
FIG. 5 illustrates one embodiment of a second channel analysis module.

FIG. 5 illustrates a more detailed block diagram for the channel analysis module 130. More particularly, FIG. 5 illustrates a more detailed block diagram for the Doppler frequency estimation module 308 and the carrier frequency offset estimation module 310.

The Doppler frequency estimation module 308 estimates a level of spectral broadening for the operating environment using the power spectral density parameter 450. The level of spectral broadening can be estimated in a number of different ways. For example, the Doppler frequency estimation module 308 may estimate the minimum and maximum Doppler frequencies by comparing the Doppler spectrum to thresholds calibrated for the operating SNR. FIG. 5 shows one particular embodiment where sharp edges of the Doppler spectrum found in Rayleigh fading environments are exploited through a derivative operator followed by threshold detection.

The Doppler frequency estimation module 308 performs spectral analysis on the Doppler spectrum using the power spectral density parameter 450 received from the Doppler spectrum characterization module 306. The Doppler frequency estimation module 308 calculates a minimum Doppler frequency min ($f_d$) and a maximum Doppler frequency max ($f_d$) by detecting the edges of the Doppler spectrum. These frequencies can be detected by extracting the maximum and minimum frequencies above a threshold level that is optimized for the operating SNR level. In a Rayleigh fading environment where signal energies are present in and against the direction of travel for a mobile device 120-1-$m$, two strong specular components at the maximum absolute Doppler frequencies can be observed. These forms the well-known U-shaped Jake's spectrum. In this scenario, the maximum Doppler spectrums are marked by the sharp spectral edges, and the derivative operator 502 and threshold detectors 504, 506 may be used to detect these points.

The carrier frequency offset estimation module 310 estimates a carrier CFO that is used to select an appropriate frequency to transmit information from the mobile device 120-1-$m$ to the fixed device 110 on the uplink channel 142-2. The results from the Doppler spectrum characterization routine described above can be used to estimate the CFO. Consider the Rayleigh fading channel where the channel spectrum resembles the symmetric U-shape. Here the CFO estimate should be at the center of the spectrum. In the scenario where a non-symmetric PSD is present such as in a Rician environment, then the spectral centroid can be taken as the CFO. Therefore, the CFO estimation can be broken down to the following two steps: (1) determine the Doppler frequencies; and (2) calculate the centroid by summing the spectrum weighted by the power density within the Doppler frequencies, as shown in Equation (7) as follows:

$$f_{offset} = \sum_{i=min(f_d)}^{max(f_d)} q_i \cdot f_i \quad (7)$$

As shown in FIG. 5, the Doppler frequencies are calculated by taking the derivative of the channel power spectral density. A simple threshold detection can also be used. The maximum and minimum Doppler frequencies limit the range for the centroid calculation.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

FIG. 6 illustrates one embodiment of a logic flow 600. The logic flow 600 may be representative of the operations executed by one or more embodiments described herein, such as one or both of the devices 110, 120.

In the illustrated embodiment shown in FIG. 6, the logic flow 600 may generate a spectral characterization parameter representing a type of operating environment for a mobile device at block 602. For example, the mobile device 120-1 may use the Doppler spectrum characterization module 306 to generate the spectral characterization parameter 152 representing a type of operating environment for the mobile device 120-1.

The logic flow 600 may send a Doppler codeword having the spectral characterization parameter for the mobile device from the mobile device to a fixed device at block 604. For example, the mobile device 120-1 may use the code generator 148 from the Doppler spectrum characterization module 306 to select a Doppler codeword 150 with the appropriate spectral characterization parameter 152, and send the Doppler codeword 150 to the fixed device 110 over the uplink channel 142-2 of the wireless shared media 140 via the radio 126.

The logic flow 600 may receive a Doppler codeword having a spectral characterization parameter for a mobile device, the spectral characterization parameter representing a type of operating environment for the mobile device, at block 606. For example, the radio 112 of the fixed device 110 may receive the Doppler codeword 150 having the spectral characterization parameter 152 for the mobile device 120-1. The spectral characterization parameter 152 may represent a type of operating environment for the mobile device 120-1, such as an isotropic scattering environment, a Rician fading environment, a symmetric environment, an asymmetric environment, and other scattering or fading environments.

The logic flow 600 may assign the mobile device to a mobility zone based on the spectral characterization parameter at block 608. For example, the zone management module 114 may decode the spectral characterization parameter 152 from the Doppler codeword 150, and assign the mobile device 120-1 to the regular mobility zone 202 or the high mobility zone 204-1-$p$ based on the decoded spectral characterization parameter 152.

The logic flow 600 may allocate resources to the mobile device based on the assigned mobility zone at block 610. For example, when the mobile device 120-1 is operating at lower speed thereby creating lower ICI for neighboring mobile devices it may be assigned to the regular mobility zone 202 and allocated less communications resources. When the mobile device 120-1 is operating at a higher speed thereby creating higher ICI for neighboring mobile devices it may be assigned to the high mobility zone 204-1-$p$ and allocated more communications resources or special communications resources suitable for high mobility users.

Figure 7:
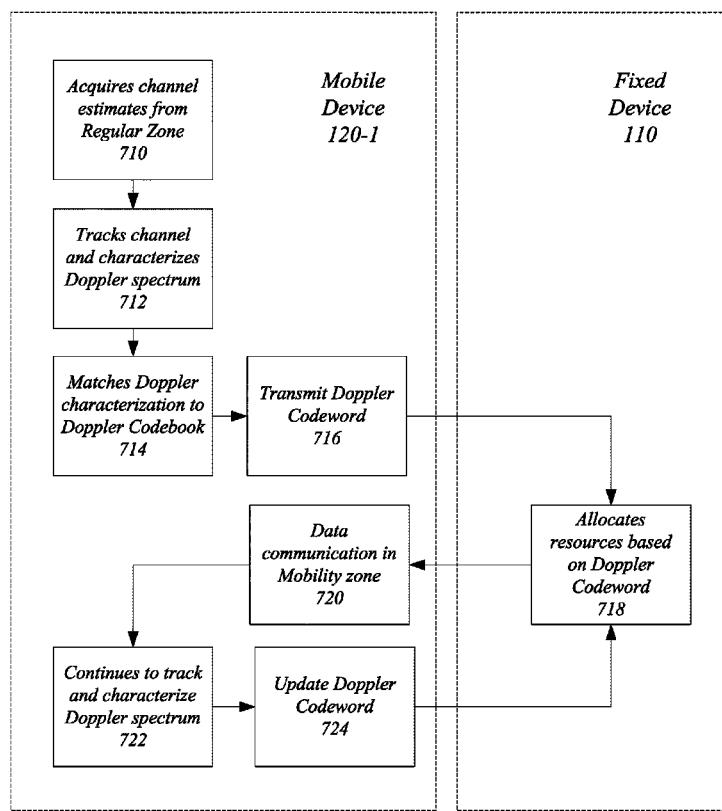
FIG. 7 illustrates one embodiment of a second logic flow.

FIG. 7 illustrates one embodiment of a logic flow 700. The logic flow 700 may be representative of the operations executed by one or more embodiments described herein, such as one or both of the devices 110, 120. For example, the logic flow 700 may illustrate a negotiation protocol for the mobility zone allocation to a mobile device 120-1-$m$. The mobile device 120-1-$m$ can originally be entering the communications system 100 or a user moving between mobility zones 202, 204-1-$p$.

In the illustrated embodiment shown in FIG. 7, the mobile device 120-1 acquires channel estimates when in the regular mobility zone 202 at block 710. The mobile device 120-1 tracks the channel and characterizes the Doppler spectrum using the enhanced spectral characterization technique at block 712. The mobile device 120-1 matches a power spectral density parameter 450 to a Doppler codebook at block 714. The mobile device 120-1 selects and transmits the Doppler codeword 150 to the fixed device 110 at block 716. The fixed device assigns the mobile device 120-1 from the regular mobility zone 202 to a high mobility zone 204-1-$p$, and allocates resources to the mobile device 120-1, based on the Doppler codeword 150 at block 718. The fixed device 110 and the mobile device 120-1 engages in data communications using special communications resources made available to the high mobility zone 204-1-$p$ at block 720. Meanwhile, the mobile device 120-1 continues to track and characterize the Doppler spectrum at block 722. The mobile device 120-1 sends an updated Doppler codeword to the fixed device 110 at block 724, which is used by the fixed device 110 to re-assign mobility zones and re-allocate communications resources as needed. The updates may be sent on a periodic basis, an aperiodic basis, on-demand basis, event basis, continuous basis, or other suitable schedule.

The enhanced spectrum characterization technique provides several advantages. For example, this technique allows for the allocation of special resources for mobility users in various scattering environments with different degrees of mobility. Allocating these resources to mobile users not only facilitates high modulation order for high mobility users, it also minimizes interference to other users with smaller degrees of mobility. In another example, the functional blocks required to generate the Doppler spectrum utilizes existing channel coefficient estimations that are already common in coherent communications. The estimation algorithm is suitable for implementation in both software and hardware. In designs that have an existing FFT implementation, the Doppler spectrum characterization module 306 can reuse this functional block thereby reducing implementation cost. In yet another example, the enhanced spectrum characterization technique supports a framework for high mobility and high data rate communications usage scenarios. The trend for increasing data rate in increasing mobility is increasing over time.

Midamble Signaling

To improve link performance, highly mobile users assigned to the high mobility zone 204 may be allocated special communications resources. In the high mobility zone 204, for example, the fixed device 110 may use special pilots called midambles to assist in performing channel estimation at the receiver side of the mobile devices 120-1-$m$.

In conventional OFDM systems, channel estimates are typically obtained by detecting pilot subcarriers that are dispersed throughout the OFDM symbol. These detected pilots provide channel response samples across the band for each symbol that can be used to correct the channel distortion by applying a so-called "one-tap zero forcing" equalizer in the frequency domain. In high mobility scenarios, however, the ICI from adjacent data subcarriers adds estimation noise to these pilot-based channel response estimates, thus limiting performance even for a minimal modulation order such as quadrature phase shift keying (QPSK), and the subsequent application of the one-tap zero forcing equalizer does not adequately mitigate ICI.

To solve these and other problems, various embodiments implement new OFDM symbol structures where channel sounding signals (e.g., pilots) are dispersed across time instead of frequency thereby allowing improved channel estimation while reducing ICI degradation. New channel sounding signals (e.g., midambles) may be used, and the processing of the sounding signals provides channel equalization that includes time varying characteristics to mitigate Doppler-induced ICI. This results in automatic mitigation of residual CFO as incorporated in the channel estimation and equalization.

Figure 8:
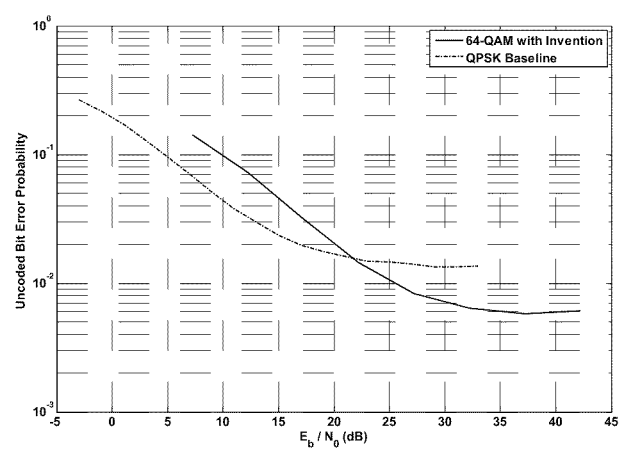
FIG. 8 illustrates one embodiment of a first graph.

FIG. 8 illustrates one embodiment of a graph 800. The graph 800 has values for uncoded bit error probabilities on a y-axis, and values for $E_b/N_o$ on an x-axis. Graph 800 provides an error performance comparison of the improved 64-QAM approach using the new channel sounding signals versus the typical QPSK approach. The data was obtained for an International Telecommunication Union (ITU) Vehicle A model at 350 kilometers/hour (km/h), a 3.5 gigahertz (GHz) center frequency, and a 512 mode OFDM signal with 420 active subcarriers at 5.6 megasamples/second.

The use of midambles enable mobile devices 120-1-$m$ traveling at high speed to receive wireless broadband data in a bandwidth efficient manner through the use of novel channel sounding signals and the associated receiver processing of those signals. As an OFDM signal passes through a mobile channel, as in a WiMAX downlink transmission from the fixed device 110 to a mobile client 120-1-m over the downlink channel 142-1, it is distorted by the time variations due to the Doppler effect. The Doppler effect introduces Doppler-induced ICI among the subcarriers in the OFDM signal. The use of midambles provides a technique to mitigate the deleterious impact on the link performance. The midambles sequence may be periodically inserted into the downlink OFDM signal to enable the mobile devices 120-1-m to accurately estimate the mobile channel. The mobile devices 120-1-m may generate a more accurate channel estimate using special midamble correlations in conjunction with parametric channel modeling. A frequency-domain equalizer may be applied to mitigate both channel frequency selectivity and Doppler-induced ICI.

Figure 9:
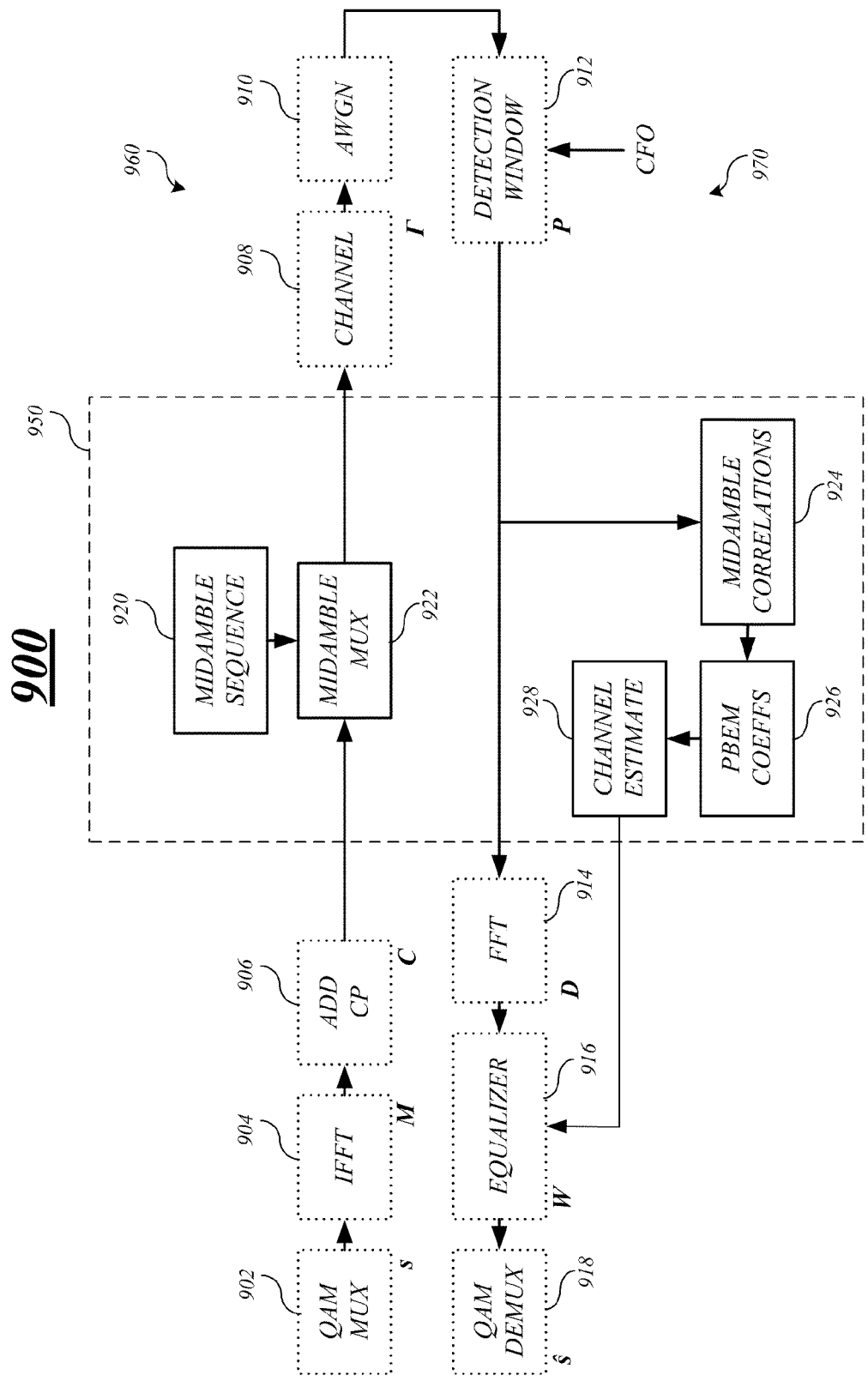
FIG. 9 illustrates one embodiment of a communications system.

FIG. 9 illustrates one embodiment of a communications system 900. The communications system 900 may be representative of, for example, the radio 126 of the mobile device 120-1. The communications system 900 may include the modules 902 through 918, which are typical elements of an OFDM system. The modules 912 through 918 may have a corresponding vector or matrix designation placed below each module. For example, the usual matrix notation for the received symbol vector at the output of the FFT is r=Hs+noise terms. Using the designations in FIG. 9, this becomes r=DPΓCMs+noise terms. To recover estimates of the transmitted data an equalizer is applied so that ŝ=Wr, where W is a function of H. Since all factors in H are deterministic except for Γ, the task at hand for the channel estimation and equalization process is to find the estimate $\hat{\Gamma}$, use it to find the overall channel estimate Ĥ=DPΓ̂CM, and finally produce W from Ĥ.

Various embodiments implement techniques to construct and process midambles to generate the parameters for the channel estimates. In one embodiment, for example, the communications system 900 may comprise a midamble processing module 950. Some or all of the midamble processing module 950 may be inserted into the conventional transmitter and receiver chains that includes the modules 902 through 918. In one embodiment, for example, the transmitter chain 960 may include a portion of the midamble processing module 950 that comprises a midamble sequence module 920 and a midamble multiplexer module 922. In one embodiment, for example, the receiver chain 970 may include a portion of the midamble processing module 950, a midamble correlations module 924, a Polynomial Basis Expansion Model (PBEM) coefficients module 926, and a channel estimate module 928. It may be appreciated that the midamble processing module 950 may include more or less elements as desired for a given implementation. The embodiments are not limited in this context.

In operation, the midamble correlations module 924 provides the midambles to the receiver chain 970 from midamble storage elements in or associated with 924. Working backwards from the channel estimate module 928, the $\hat{\Gamma}$ matrix is to be generated. This is an upper diagonal matrix with the diagonals consisting of the time samples of each resolvable delay path in the channel. A PBEM is used to represent these time varying gains wherein a different polynomial is selected to model each of these delay paths. For simplicity a cubic spline is used for the polynomial form, and specifically a clamped cubic spline is employed. To obtain the four coefficients for this third-order polynomial the endpoints and slopes at those points need to be generated. This function is provided by the PBEM coefficients module 926, which in turn, processes correlation values from the midamble correlations module 924. Within the span of each received midambles, the midamble correlations module 924 produces two correlations spaced roughly one-half symbol apart. These two values are sufficient to determine the endpoint and slope values for the cubic spline curve fitting. In this manner, the spline model spans the ODFM data symbols that are flanked by midambles.

Figure 10:
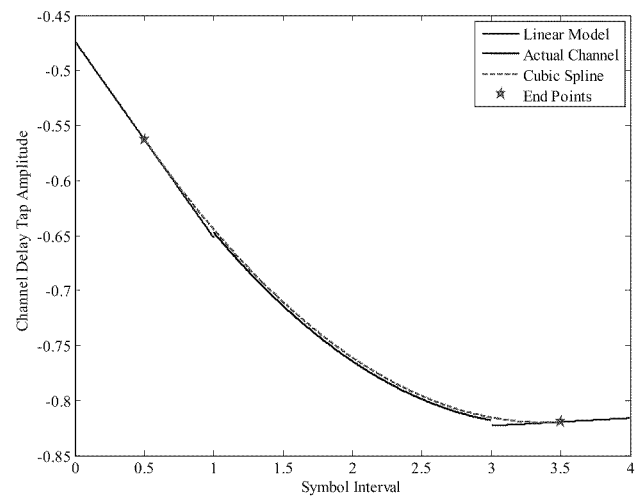
FIG. 10 illustrates one embodiment of a second graph.

FIG. 10 illustrates one embodiment of a graph 1000. The graph 1000 illustrates values for a channel delay tap amplitude on a y-axis, and values for a symbol interval on an x-axis. The graph 1000 illustrates a curve fit using a clamped cubic spline with linear channel estimates obtained from midambles flanking two OFDM data symbols.

Figure 11:
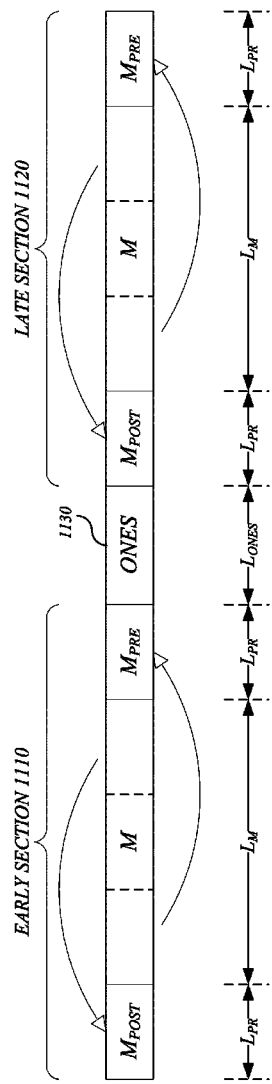
FIG. 11 illustrates one embodiment of a signal structure.

FIG. 11 illustrates one embodiment of a signal structure 1100. The signal structure 1100 represents a novel channel sounding signal structure used as a midamble in an OFDM system, such as the communications system 100. The signal structure 1100 comprises an early section 1110 and a late section 1120, both of which share a similar structure. They are partitioned by a section 1130 comprising a sequence of ones that is $L_{ONES}$ samples long. The core of the early section is an M-sequence that is $L_M$ sample long. An M-sequence is also known as a maximal length pseudo-noise sequence. This is preceded by a prefix denoted $M_{POST}$ which is made up of the last $L_{PR}$ samples of M. Additionally, M is followed by a postfix denoted $M_{PRE}$ which is made up of the first $L_{PR}$ samples of M.

The signal structure 1100 allows the communications system 900 to correlate the M-sequence with the early and late sections 1110, 1120 separately. The separate correlator outputs are processed to yield the value and slope of each resolvable path delay at that point in time. These time dependent parameters are then used to determine the clamped cubic spline model for each resolvable path delay. This operation includes two successive midambles to provide the start and end points and slopes as previously shown in graph 1000. The resulting cubic splines for each path delay make up the diagonals of the estimate $\hat{\Gamma}$, as previously described, which completes the channel estimation and equalization operations.

Figure 12:
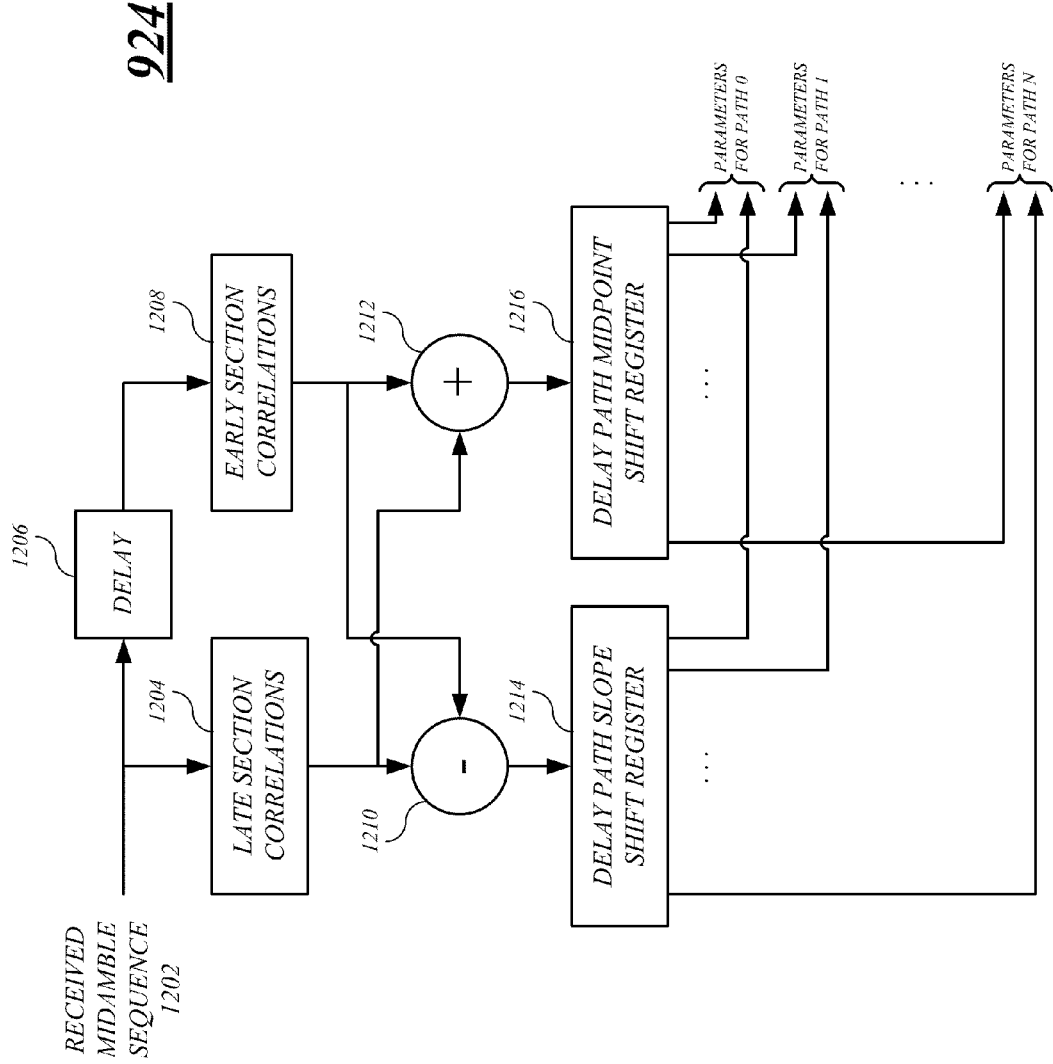
FIG. 12 illustrates one embodiment of a midamble correlations module.

FIG. 12 illustrates a more detailed block diagram for the midamble correlations module 924. The midamble correlations module 924 performs midamble processing to determine slope and endpoint values for each channel delay path cubic spline model. In the illustrated embodiment shown in FIG. 12, a late section correlations module 1204 and an early section correlations module 1208 receive a received midamble sequence 1202. The received midamble sequence 1202 is delayed as input to the early section correlations module 1208 by a delay module 1206. The outputs of the modules 1204, 1208 are both received as a set of inputs to a subtractor 1210 and an adder 1212. The output from the subtractor 1210 is stored by a delay path slope shift register, which outputs slope parameters for paths 0-N. The output from the adder 1212 is stored by a delay path midpoint shift register 1216, which outputs endpoint parameters for paths 0-N.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a fixed device having a zone management module operative to perform mobility zone classification for multiple mobile devices in a mobile broadband communications system utilizing an orthogonal frequency-division multiple access technique, the zone management module operative to:
assign the mobile devices to different mobility zones based on a spectral characterization parameter representing a type of operating environment for each mobile device, one or more of the mobile devices assigned to a high mobility zone based on the spectral characterization parameter;
assign the one or more mobile devices assigned to the high mobility zone to one or more high mobility sub-zones of the high mobility zone based on a mobility parameter for each of the one or more mobile devices assigned to the high mobility zone;
allocate different resources to the mobile devices based on the assigned mobility zones;
send midambles to mobile devices assigned to the high mobility zone and not to mobile devices assigned to a regular mobility zone; and
utilize a smaller packet size for mobile devices assigned to the high mobility zone than for mobile devices assigned to the regular mobility zone; and
a radio communicatively coupled to the zone management module, the radio operative to receive a Doppler codeword from one or more mobile devices, the Doppler codeword comprising the spectral characterization parameter for the one or more mobile devices.

2. The apparatus of claim 1, the zone management module operative to assign mobile devices to the regular mobility zone based on the spectral characterization parameter.

3. The apparatus of claim 1, the operating environment comprising an isotropic scattering environment, a Rician fading environment, a symmetric environment, or an asymmetric environment.

4. The apparatus of claim 1, the Doppler codeword comprising the mobility parameter for the one or more mobile devices, the mobility parameter representing a degree of mobility for the one or more mobile devices.

5. The apparatus of claim 1, the zone management module operative to allocate resources to the mobile devices based on the assigned mobility zones.

6. An apparatus, comprising:
a mobile device for a mobile broadband communications system utilizing an orthogonal frequency-division multiple access technique, the mobile device comprising:
a channel analysis module operative to generate a spectral characterization parameter representing a type of operating environment for the mobile device;
a mobility module operative to generate a mobility parameter for the mobile device;

a radio operative to transmit a Doppler codeword comprising the spectral characterization parameter and the mobility parameter to a fixed device, the mobile device assigned to a high mobility zone based on the spectral characterization parameter and assigned to a high mobility subzone within the high mobility zone based on the mobility parameter; and a midamble processing module communicatively coupled to the radio, the midamble processing module operative to:

receive a midamble sequence from the fixed device, the midamble sequence not transmitted to a mobile device is assigned to a regular mobility zone; and generate a channel estimate parameter using the midamble sequence.

7. The apparatus of claim 6, comprising a Doppler spectrum characterization module operative to receive a channel estimate parameter, and generate a power spectral density parameter based on the channel estimate parameter, the power spectral density parameter comprising a spectral domain representation of a channel autocorrelation in an ergodic system.

8. The apparatus of claim 6, comprising a Doppler spectrum characterization module operative to compare a power spectral density parameter with a Doppler codebook.

9. The apparatus of claim 6, comprising a Doppler spectrum characterization module operative to generate the spectral characterization parameter by comparing a power spectral density parameter with spectrum parameters in a Doppler codebook.

10. The apparatus of claim 6, the mobility parameter representing a degree of mobility for the mobile device.

11. The apparatus of claim 6, comprising a Doppler frequency estimation module communicatively coupled to a Doppler spectrum characterization module, the Doppler frequency estimation module operative to estimate a level of spectral broadening for the operating environment using the power spectral density parameter.

12. The apparatus of claim 6, comprising an omni-directional antenna communicatively coupled to a transceiver, the omni-directional antenna to send and receive communication signals over a wireless communication media.

13. A method, comprising:

receiving a Doppler codeword comprising a spectral characterization parameter and a mobility parameter for a mobile device, the spectral characterization parameter representing a type of operating environment for the mobile device;

assigning the mobile device to a high mobility zone based on the spectral characterization parameter;

assigning the mobile device to a high mobility subzone of the high mobility zone based on a mobility parameter for the mobile device;

allocating resources to the mobile device based on the assigned mobility zone;

utilizing a packet size for the mobile device that is smaller than a packet size used for a mobile device assigned to a regular mobility zone; and sending midambles to the mobile device and not sending midambles to the mobile device assigned to the regular mobility zone.

14. The method of claim 13, the mobility parameter representing a degree of mobility for the mobile device.

15. The method of claim 13, comprising re-assigning the mobile device to a different mobility zone based on an updated Doppler codeword with an updated spectral characterization parameter.

16. A method, comprising:

generating a spectral characterization parameter representing a type of operating environment for a mobile device;

generating a mobility parameter for the mobile device;

sending a Doppler codeword comprising the spectral characterization parameter and the mobility parameter from the mobile device to a fixed device, the mobile device assigned to a high mobility zone based on the spectral characterization parameter and assigned to a high mobility subzone within the high mobility zone based on the mobility parameter;

receiving a midamble sequence from the fixed device, the midamble sequence not transmitted to a mobile device assigned to a regular mobility zone; and generating a channel estimate parameter at the mobile device using the midamble sequence.

17. The method of claim 16, comprising:

receiving a channel estimate parameter; and generating a power spectral density parameter based on the channel estimate parameter, the power spectral density parameter comprising a spectral domain representation of a channel autocorrelation in an ergodic or approximately ergodic system.

18. The method of claim 16, comprising comparing a power spectral density parameter with a Doppler codebook.

19. The method of claim 16, comprising comparing a power spectral density parameter with spectrum parameters in a Doppler codebook, and selecting the Doppler codeword from the Doppler codebook.

20. The method of claim 16, the mobility parameter representing a degree of mobility for the mobile device.

21. The method of claim 16, comprising estimating a level of spectral broadening for the operating environment using the power spectral density parameter.

* * * * *